United States Patent
Florkey et al.

(10) Patent No.: US 7,107,047 B2
(45) Date of Patent: Sep. 12, 2006

(54) EMPLOYMENT OF ESTABLISHED TELEPHONE NUMBER OF MOBILE DEVICE SUPPORTED BY SERVING MOBILE SWITCHING CENTER TO CONNECT A CALL TO THE MOBILE DEVICE

(75) Inventors: Cynthia Kae Florkey, Chicago, IL (US); Ruth Schaefer Gayde, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 210 days.

(21) Appl. No.: 10/697,484

(22) Filed: Oct. 29, 2003

(65) Prior Publication Data

US 2005/0096022 A1    May 5, 2005

(51) Int. Cl.
*H04M 3/42* (2006.01)
(52) U.S. Cl. .............. 455/415; 455/414.1; 455/432.1
(58) Field of Classification Search ............. 455/403, 455/404.1, 414.1, 410, 415, 421, 424, 432.1, 455/432, 433, 436
See application file for complete search history.

(56) References Cited

U.S. PATENT DOCUMENTS

| | | | | |
|---|---|---|---|---|
| 5,467,381 A | * | 11/1995 | Peltonen et al. | 455/432.1 |
| 5,537,457 A | * | 7/1996 | Lantto et al. | 455/433 |
| 6,038,445 A | * | 3/2000 | Alperovich et al. | 455/432.1 |
| 6,122,509 A | * | 9/2000 | Nguyen | 455/433 |
| 6,253,081 B1 | * | 6/2001 | Koster | 455/433 |
| 6,298,234 B1 | * | 10/2001 | Brunner | 455/432.1 |
| 6,490,450 B1 | * | 12/2002 | Batni et al. | 455/433 |
| 2001/0014606 A1 | * | 8/2001 | Kim | 455/432 |
| 2002/0115441 A1 | * | 8/2002 | Alonso et al. | 455/445 |
| 2003/0114154 A1 | * | 6/2003 | Lin et al. | 455/432 |

\* cited by examiner

*Primary Examiner*—CongVan Tran

(57) ABSTRACT

An apparatus in one example comprises an originating mobile switching center and a serving mobile switching center that serve to connect a call from a communication device to a mobile device that is supported by the serving mobile switching center. The mobile device is associated with an established telephone number. The serving mobile switching center is associated with an identification number. The originating mobile switching center employs the identification number to connect the call with the serving mobile switching center. The serving mobile switching center employs the established telephone number to connect the call to the mobile device.

24 Claims, 2 Drawing Sheets

EMPLOYMENT OF ESTABLISHED TELEPHONE NUMBER OF MOBILE DEVICE SUPPORTED BY SERVING MOBILE SWITCHING CENTER TO CONNECT A CALL TO THE MOBILE DEVICE

TECHNICAL FIELD

The invention relates generally to communications and more particularly to call delivery to roaming mobile devices.

BACKGROUND

In mobile telecommunication networks, a serving mobile switching center ("S-MSC") and an originating mobile switching center ("O-MSC") serve to connect a call from a communication device to a mobile device that is supported by the serving mobile switching center. For example, the mobile device comprises a roaming mobile device. The originating mobile switching center supports call delivery to the serving mobile switching center and the serving mobile switching center supports an air interface connection with the mobile device.

To initiate the call to the mobile device, the communication device initiates a call setup message to the originating mobile switching center. In one example, the mobile telecommunication network comprises an American National Standards Institute ("ANSI-41") network. The originating mobile switching center sends a location request invoke operation/message ("LOCREQ") to a home location register ("HLR") to determine the location of the mobile device. The home location register checks a record associated with the mobile device and in one example determines that the mobile device is registered at the serving mobile switching center. Therefore, the home location register sends a routing request invoke message/operation ("ROUTREQ") to the serving mobile switching center. In another example, the mobile telecommunication network comprises a Global System for Mobile Communications ("GSM") network and employs GSM mobile application part ("MAP") messages for call delivery. For example, the GSM network employs a send routing information ("SRI") message and a provide roaming number ("PRN") message to initiate delivery of the call to the mobile device.

Upon receipt of the routing request invoke message, the serving mobile switching center allocates a temporary roaming number for the call from a pool of available temporary roaming numbers. In one example, the mobile telecommunication network comprises an ANSI-41 network and the temporary roaming number comprises a temporary local directory number ("TLDN"). In another example, the mobile telecommunication network comprises a GSM network and the temporary roaming number comprises a mobile subscriber roaming number ("MSRN"). The serving mobile switching center sends the temporary roaming number to the home location register in a routing request return result operation/message ("routreq"). The home location register sends the temporary roaming number to the originating mobile switching center in a location request return result operation/message ("locreq"). The GSM network employs a provide roaming number acknowledgement message and a send routing information acknowledgement message to return the temporary roaming number.

The serving mobile switching center associates the temporary roaming number with the mobile device and awaits an incoming call that indicates the temporary roaming number as a called party number. Upon receipt of the temporary roaming number, the originating mobile switching center sends the call to the serving mobile switching center over a trunk. In one example, the trunk signaling comprises Integrated Services Digital Network User Part ("ISUP") signaling. Thus, the originating mobile switching center sets the called party number of an initial address message ("IAM") to the temporary roaming number. The originating mobile switching center sends the initial address message to the serving mobile switching center to pass the call to the serving mobile switching center.

Upon receipt of the initial address message, the serving mobile switching center searches for the mobile device that is associated with the temporary roaming number in a list of active temporary roaming numbers. Upon finding the mobile device, the serving mobile switching center proceeds with call termination processing, which may include paging the mobile device to indicate the incoming call. Upon connection of the call with the mobile device, the serving mobile switching center returns the temporary roaming number to the pool of available temporary roaming numbers.

The serving mobile switching center must keep a pool of available temporary roaming numbers that is large enough to handle incoming calls to roaming mobile devices. For example, the pool of available temporary roaming numbers may comprise one thousand telephone numbers reserved for incoming call delivery to the roaming mobile devices. As one shortcoming, the pool of available temporary roaming numbers are unavailable for other uses. For example, the pool of available temporary roaming numbers may contribute to a shortage of telephone numbers. As another shortcoming, if the pool of available temporary roaming numbers are all assigned at a given time, then the serving mobile switching center is unable to handle new incoming calls to the roaming mobile devices. As yet another shortcoming, the serving mobile switching center must have storage space available to keep a record of the assignment of temporary roaming numbers.

Thus, a need exists for a delivery system for incoming calls to roaming mobile devices that promotes a reduction in a number of reserved temporary roaming numbers.

SUMMARY

The invention in one implementation encompasses an apparatus. The apparatus comprises an originating mobile switching center and a serving mobile switching center that serve to connect a call from a communication device to a mobile device that is supported by the serving mobile switching center. The mobile device is associated with an established telephone number. The serving mobile switching center is associated with an identification number. The originating mobile switching center employs the identification number to connect the call with the serving mobile switching center. The serving mobile switching center employs the established telephone number to connect the call to the mobile device.

Another implementation of the invention encompasses a method. An identification number of a serving mobile switching center that supports a roaming mobile device is determined. A call to the roaming mobile device is connected through employment of the identification number to contact the serving mobile switching center and an established telephone number of the roaming mobile device to contact the roaming mobile device.

Yet another implementation of the invention encompasses an article. The article comprises one or more computer-readable signal-bearing media. The article comprises means in the one or more media for determining an identification number of a serving mobile switching center that supports a roaming mobile device. The article comprises means in the one or more media for connecting a call to the roaming mobile device through employment of the identification number to contact the serving mobile switching center and an established telephone number of the roaming mobile device to contact the roaming mobile device.

DESCRIPTION OF THE DRAWINGS

Features of exemplary implementations of the invention will become apparent from the description, the claims, and the accompanying drawings in which:

DETAILED DESCRIPTION

Figure 1:
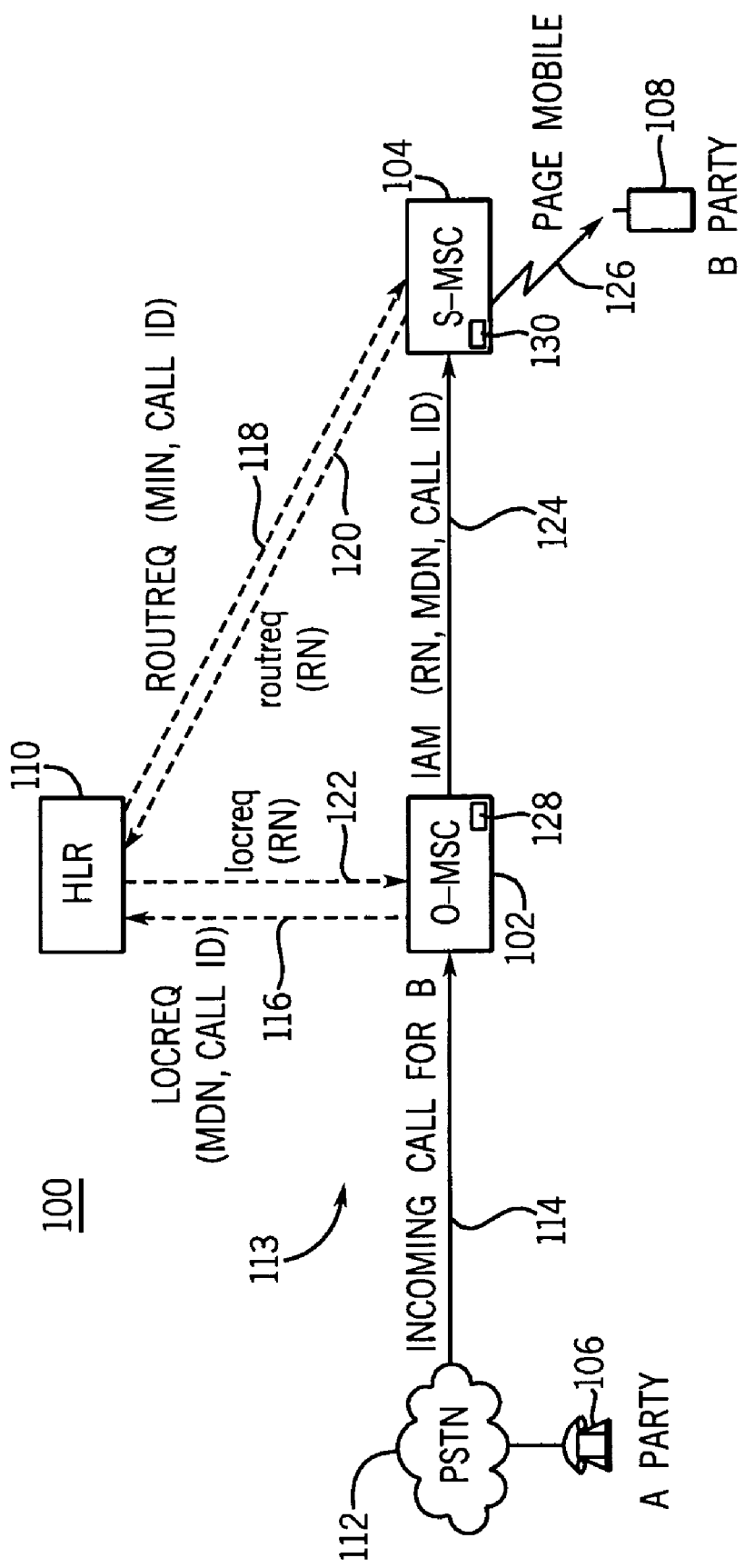
FIG. 1 is a representation of an exemplary implementation of an apparatus that comprises one or more call control components, a communication device, a mobile device, and a home location register and illustrates exemplary message flow for a connection of an incoming call from the communication device to the mobile device.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example comprises one or more call control components, for example, an originating mobile switching center ("O-MSC") 102 and a serving mobile switching center ("S-MSC") 104, a communication device 106, a mobile device 108, and a home location register ("HLR") 110. The apparatus 100 enables delivery of an incoming call to the mobile device 108 that is supported by the serving mobile switching center 104. For example, the mobile device 108 comprises a roaming mobile device.

The originating mobile switching center 102 and/or the serving mobile switching center 104 are associated with one or more identification numbers, for example, routing numbers ("RNs"). The serving mobile switching center 104 in one example is associated with an identification number that uniquely identifies the serving mobile switching center 104. For example, the serving mobile switching center 104 comprises a single identification number used as the routing number for any incoming call for a roaming mobile device. Other network components may route communications to the serving mobile switching center 104 through employment of the identification number. Also, the other network components may route communications to roaming mobile devices supported by the serving mobile switching center 104 through employment of the identification number. The serving mobile switching center 104 may employ the single identification number for a plurality of contemporaneous calls. For example, the serving mobile switching center 104 is able to accept and connect multiple contemporaneous incoming calls to multiple roaming mobile devices through employment of the single identification number.

The serving mobile switching center 104 in one example may be associated with a plurality of identification numbers.

Upon receipt of a call delivery request, the serving mobile switching center 104 may select an identification number for the incoming call from the plurality of identification numbers associated with the serving mobile switching center 104 based on one or more characteristics of the incoming call. For example, the serving mobile switching center 104 may employ information from the subscriber profile of the mobile device 108 to select the identification number.

The serving mobile switching center 104 in one example selects a first identification number from the plurality of identification numbers to classify the incoming call into a first category. Upon receipt of a second call, the serving mobile switching center 104 may select a second identification number from the plurality of identification numbers to classify the second call into a second category. For example, the serving mobile switching center 104 provides a first service or feature to calls with the first identification number and provides a second service or feature to calls with the second identification number. In one example, the second service differs from the first service. For example, the serving mobile switching center 104 employs a first call handling logic for the calls associated the first identification number and a second call handling logic for the calls associated the second identification number.

In one example, the serving mobile switching center 104 provides different grades of quality of service ("QoS"). The serving mobile switching center 104 could employ different identification numbers (e.g., routing numbers) for incoming calls based on the grade of service for which the initiator or recipient of the call is willing to pay. For example, law enforcement officials may be assigned a higher grade of service, so that incoming calls to the law enforcement officials receive priority handling over calls to other users during times of system overload. The serving mobile switching center 104 assigns an identification number to the incoming call to the law enforcement officials that indicates the higher grade of service.

In another example, the serving mobile switching center 104 employs two different physical trunks for outgoing calls. Thus, the serving mobile switching center 104 may employ two different identification numbers. For example, the serving mobile switching center 104 associates the first identification number with any call that requires routing/tandeming to the first physical trunk and associates the second identification number any with call that requires routing/tandeming to the second physical trunk.

In yet another example, the serving mobile switching center 104 employs an adjunct server for processing calls that meet one or more criteria. The serving mobile switching center 104 may employ two different identification numbers to either involve the adjunct server on the call or prevent adjunct server processing. For example, the serving mobile switching center 104 associates the first identification number with any call that requires routing to the adjunct server and associates the second identification number any with call that does not involve the adjunct server.

The communication device 106 may comprise a landline telephone, a mobile telephone, a soft phone, or a personal computer. In one example where the communication device 106 comprises a landline device, a public switched telephone network ("PSTN") 112 connects the communication device 106 with the originating mobile switching center 102. The communication device 106 initiates a call to the mobile device 108 by sending the call through the public switched telephone network 112 to the originating mobile switching center 102 for the mobile device 108.

The mobile device 108 in one example comprises a roaming mobile telephone. The mobile device 108 is supported by the serving mobile switching center 104. The home location register 110 in one example stores the location and service information of the mobile device 108. For example, upon registration of the mobile device 108 with the serving mobile switching center 104, the serving mobile switching center 104 sends updated location information to the home location register 110. Upon an incoming call to the mobile device 108, the originating mobile switching center 102 consults the home location register 110 to find the mobile device 108.

The mobile device 108 comprises an established telephone number. A user of the communication device 106 in one example dials the established telephone number of the mobile device 108 to initiate the call to the mobile device 108. The established telephone number comprises a number that is associated with the mobile device 108 for a period longer than a connection period or duration of the call. For example, the established telephone number is not a temporary number associated with the mobile device 108 for the call. The established telephone number is associated with the mobile device 108 for substantially all calls made to or from the mobile device 108.

The serving mobile switching center 104 in one example connects the call to the mobile device 108 without allocation of a temporary roaming number for the mobile device 108. For example, the originating mobile switching center 102 employs the identification number of the serving mobile switching center 104 to route the call to the serving mobile switching center 104 that supports the mobile device 108. Then, the serving mobile switching center 104 employs the established telephone number of the mobile device 108 to locate the mobile device 108 and the serving mobile switching center 104 pages the mobile device 108 for connection of the call to the mobile device 108.

The established telephone number in one example comprises a mobile directory number ("MDN"). The serving mobile switching center 104 employs the established telephone number of the mobile device 108 to determine a mobile identification number ("MIN") associated with the mobile device 108. The serving mobile switching center 104 employs the mobile identification number to page the mobile device 108. The serving mobile switching center 104 may connect the call to the mobile device 108 without allocation of a temporary roaming number, for example, a temporary local directory number ("TLDN") or a mobile subscriber roaming number ("MSRN").

To deliver incoming calls to roaming mobile devices through employment of the temporary roaming numbers, prior serving mobile switching centers kept a pool of available temporary roaming numbers to handle incoming calls to the roaming mobile devices. In one example, the pool of available temporary roaming numbers may be on the order of one thousand telephone numbers reserved for incoming call delivery to the roaming mobile devices. Thus, as described herein, employing a single identification number or a relatively small group of identification numbers of the serving mobile switching center 104 to route incoming calls to the mobile device 108 allows the pool of available temporary roaming numbers to be used for other purposes. Thus, the employment of the single identification number or relatively small group of identification numbers to route incoming calls to the mobile device 108 promotes an increase in available telephone numbers. Thus, a plurality of calls may be routed to roaming mobile devices with as few as one routing number rather than employing a large pool of temporary roaming numbers.

To route the incoming call to the mobile device 108, the originating mobile switching center 102 employs two directory numbers, for example, the identification number of the serving mobile switching center 104 and the established telephone number of the mobile device 108. Signaling messages associated with the routing of the call carry the two directory numbers. In one example, the signaling messages are able to carry at least two standard ten digit telephone numbers. In another example, the signaling messages are able to carry at least two identification numbers larger or smaller than ten digits. The signaling messages for call setup in one example comprises integrated services digital network user part ("ISUP") or session initiation protocol ("SIP") messages. The signaling messages for call delivery in one example comprise ANSI-41 or GSM mobile application part ("MAP").

The originating mobile switching center 102 and/or the serving mobile switching center 104 determine whether a capable signaling path exists between the communication device 106 and the mobile device 108 that supports signaling messages capable of carrying the identification number of the serving mobile switching center 104, the established telephone number of the mobile device 108, and the call identification value. The originating mobile switching center 102 in one example assigns the call identification value for the call. The originating mobile switching center 102 and/or the serving mobile switching center 104 in one example employ a service bureau that sends network topology information to the originating mobile switching center 102 and the serving mobile switching center 104. The originating mobile switching center 102 and/or the serving mobile switching center 104 employ the network topology information to determine whether a capable signaling path exists that supports the signaling messages.

In one example, the capable signaling path does exist and the serving mobile switching center 104 sends the identification number of the serving mobile switching center 104 back to the originating mobile switching center 102. The serving mobile switching center 104 does not need to predetermine whether a signaling path exists between the communication device 106 and the mobile device 108 that is able to support the signaling messages that carry the identification number of the serving mobile switching center 104, the established telephone number of the mobile device 108, and the call identification value. For example, the serving mobile switching center 104 may instruct the originating mobile switching center 102 to use a path between the communication device 106 and the mobile device 108 that is able to support the signaling messages capable of carrying the identification number of the serving mobile switching center 104, the established telephone number of the mobile device 108, and the call identification value.

In another example, the signaling path between the serving mobile switching center 104 and the originating mobile switching center 102 does not have the capability to support the signaling messages that carry the identification number of the serving mobile switching center 104, the established telephone number of the mobile device 108, and the call identification value. Thus, the serving mobile switching center 104 sends a temporary routing number for the call back to the originating mobile switching center 102. The originating mobile switching center 102 will proceed to connect the call to the serving mobile switching center 104 upon receipt of either of the identification number of the serving mobile switching center 104 or the temporary routing number.

In addition to the network topology information, the serving mobile switching center 104 in one example employs knowledge of the capabilities of the originating mobile switching center 102. For example, the serving mobile switching center 104 determines whether the originating mobile switching center 102 is able to place in a call setup message to the serving mobile switching center 104, the identification number of the serving mobile switching center 104, the established telephone number of the mobile device 108, and a call identification that uniquely identifies the call.

In one example, the serving mobile switching center 104 determines the capabilities of the originating mobile switching center 102 based on an ANSI-41 revision level that the serving mobile switching center 104 keeps on file for the originating mobile switching center 102. In another example, the originating mobile switching center 102 signals the capabilities with each call delivery. For example, the originating mobile switching center 102 could set a parameter in a location request invoke operation/message ("LOCREQ") sent to the home location register 110 that indicates the capabilities. The home location register 110 would send an indication of the capabilities in a routing request invoke operation/message ("ROUTREQ") to the serving mobile switching center 104.

An illustrative description of one exemplary operation of the apparatus 100 is now presented, for explanatory purposes. A message flow 113 represents an exemplary connection of an incoming call from the communication device ("A PARTY") 106 to the mobile device ("B PARTY") 108 that is supported by the serving mobile switching center 104. The message flow 113 illustrates in one example ANSI-41 network messages and procedure to connect the call from the communication device 106 to the mobile device 108.

To initiate the call to the mobile device 108, the communication device 106 employs line signaling to send a setup message to a supporting network. In response to the setup message from the communication device 106, the supporting network employs trunk signaling to send a setup message 114 to the originating mobile switching center 102. The setup message 114 indicates the incoming call is for the mobile device 108.

Upon receipt of the setup message 114, the originating mobile switching center 102 sends a location request invoke message 116 to the home location register 110. "LOCREQ (MDN, CALL ID)" in one example serves to represent the location request invoke message 116. The location request invoke message 116 passes the established telephone number ("MDN") of the mobile device 108 and a call identification ("CALL ID") to the home location register 110. The originating mobile switching center 102 sets the call identification to uniquely identify the call. For example, the call identification may comprise a billing identification parameter and an identifier of the originating mobile switching center 102.

The originating mobile switching center 102 employs the location request invoke message 116 to determine the location of the mobile device 108. The home location register 110 checks a record associated with the mobile device 108 and in one example determines that the mobile device 108 is registered under the serving mobile switching center 104. Therefore, the home location register sends a routing request invoke message 118 to the serving mobile switching center 104. "ROUTREQ (MIN, CALL ID)" in one example serves to represent the routing request invoke message 118. The routing request invoke message 118 passes the call identification that uniquely identifies the call. The routing request invoke message 118 sets up communication with the serving mobile switching center 104. Also, the routing request invoke message 118 requests information of the serving mobile switching center 104. For example, the routing request invoke message 118 requests the identification number (e.g., the routing number) of the serving mobile switching center 104.

The serving mobile switching center 104 responds to the routing request invoke message 118 by sending a routing request return result operation/message ("routreq") 120 to the home location register 110. The routing request return result message 120 comprises an indication of the identification number of the serving mobile switching center 104. In one example, the serving mobile switching center 104 comprises a single identification number. Thus, the serving mobile switching center 104 sends the single identification number to the home location register 110 in the routing request return result message 120. In another example, the serving mobile switching center 104 comprises a plurality of identification numbers. Thus, the serving mobile switching center 104 selects one of the plurality of identification numbers to send to the home location register 110 in the routing request return result message 120. For example, the serving mobile switching center 104 selects the one of the plurality of identification numbers based on one or more characteristics of the call or one or more services to be provided to the call.

Upon receipt of the routing request return result message 120, the home location register 110 sends the identification number of the serving mobile switching center 104 to the originating mobile switching center 102 in a location request return result operation/message ("locreq") 122. Upon receipt of the identification number of the serving mobile switching center 104, the originating mobile switching center 102 sends the call to the serving mobile switching center 104 over a trunk. The trunk signaling in one example comprises Integrated Services Digital Network User Part ("ISUP") signaling, for example, an initial address message 124. "IAM (RN, MDN, CALL ID)" in one example serves to represent the initial address message 124.

In one example, the originating mobile switching center 102 sets a serving mobile switching center parameter of the initial address message 124 to the identification number of the serving mobile switching center 104. Also, the originating mobile switching center 102 sets a called party parameter of the initial address message 124 to the established telephone number of the mobile device 108.

In another example, the originating mobile switching center 102 sets the called party parameter of the initial address message 124 to the identification number of the serving mobile switching center 104. Also, the originating mobile switching center 102 sets a generic address parameter, redirecting number parameter, or any other defined parameter of the initial address message 124 to the established telephone number of the mobile device 108. If the originating mobile switching center 102 sets the generic address parameter to the established telephone number of the mobile device 108, then a forward call indicator will alert the serving mobile switching center 104 that the call is a mobile redirection. Thus, the serving mobile switching center 104 will determine the recipient of the call from the generic address parameter. If the originating mobile switching center 102 sets the redirecting number parameter to the established telephone number of the mobile device 108, then the redirecting number parameter will alert the serving mobile switching center 104 that the call is a mobile redirection. Thus, the serving mobile switching center 104 will determine the recipient of the call from the redirecting number parameter.

The originating mobile switching center 102 sends the initial address message 124 to the serving mobile switching center 104 to pass the call to the serving mobile switching center 104. Upon receipt of the initial address message 124, the serving mobile switching center 104 proceeds with call termination processing, for example, the serving mobile switching center 104 may send a page indication 126 to the mobile device 108. Upon acceptance of the incoming call, the mobile device 108 will send a connect message to the serving mobile switching center 104 to begin communication with the communication device 104.

Figure 2:
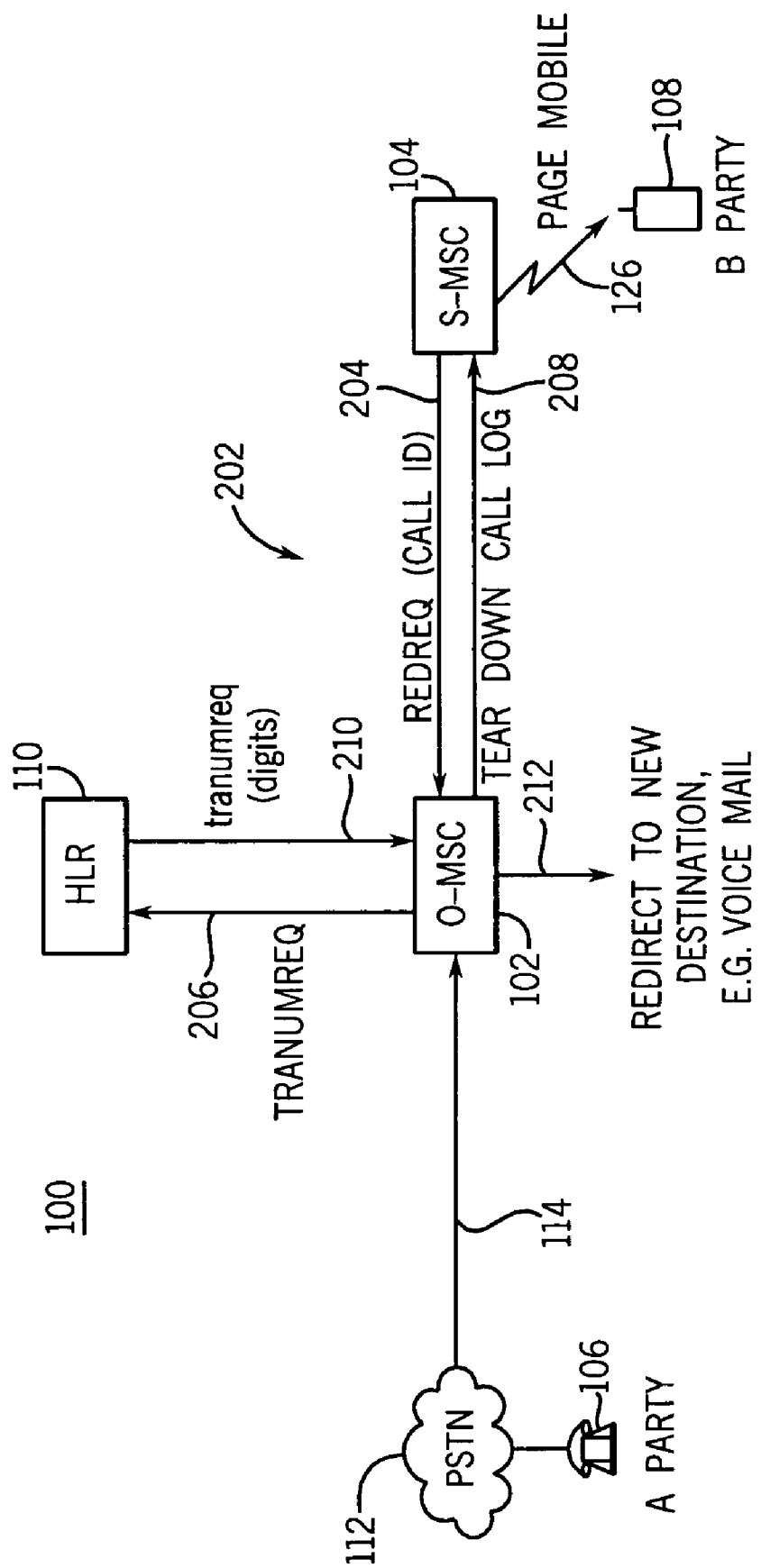
FIG. 2 illustrates exemplary message flow for a late call forwarding of an incoming call to the mobile device of the apparatus of FIG. 1.

Turning to FIG. 2, a message flow 202 represents an exemplary late call forwarding of an incoming call to the mobile device 108 that is supported by the serving mobile switching center 104. The message flow 202 illustrates in one example ANSI-41 network messages and procedure to connect the call from the communication device 106 to the mobile device 108.

If the mobile device 108 doesn't accept the incoming call in the page indication 126, then the serving mobile switching center 104 in one example determines that the call requires a late call forwarding. The serving mobile switching center 104 sends a redirection request 204 to the originating mobile switching center 102. "REDREQ (CALL ID)" in one example serves to represent the redirection request 204. The serving mobile switching center 104 passes the call identification value to the originating mobile switching center 102 in the redirection request 204. The call identification value uniquely identifies the call from any other possible incoming calls to the mobile device 108. The serving mobile switching center 104 received the call identification value in the initial address message 124 (FIG. 1).

Upon receipt of the redirection request 204, the originating mobile switching center 102 proceeds with late call forwarding delivery by sending a transfer to number request invoke ("TRANUMREQ") message/operation 206 to the home location register 110 to determine a routing number for the voicemail server. Also, the originating mobile switching center 102 tears down the call leg 208 that connects with the serving mobile switching center 104. In response to the transfer to number request message 206, the home location register 110 returns the routing number for the voicemail server in a transfer to number request return result ("tranumreq") message 210. The originating mobile switching center 102 extends the call in a delivery message 212 to the voicemail server to receive the late call forwarding.

As described above, the message flows 113 and 202 illustrate ANSI-41 network messages and procedure to connect the call from the communication device 106 to the mobile device 108. In another example, the telecommunications network that connects the call between the communication device 106 and the mobile device 108 comprises a Global System for Mobile Communications ("GSM") network. Thus, the ANSI-41 network messages are replaced with Global System for Mobile Communications network messages. For example, in Global System for Mobile Communications messaging, the location request invoke message 116 comprises a send routing information ("SRI") message, the routing request invoke message 118 comprises a provide roaming number ("PRN") message, the routing request return result message 120 comprises a provide roaming number acknowledgement message, and the location request return result message 122 comprises a send routing information acknowledgement message.

The apparatus 100 in one example employs one or more computer-readable signal-bearing media. One example of a computer-readable signal-bearing medium for the apparatus 100 comprises one or more instances of recordable data storage medium 128 and 130 of one or more of the call control components 102 and 104. For example, the recordable data storage medium comprises one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
    an originating mobile switching center and a serving mobile switching center that serve to connect a call from a communication device to a roaming mobile device that is supported by the serving mobile switching center;
    wherein the roaming mobile device is associated with an established telephone number, wherein the serving mobile switching center is associated with an identification number;
    wherein the originating mobile switching center employs the identification number to connect the call with the serving mobile switching center;
    wherein the serving mobile switching center employs the established telephone number to locate the roaming mobile device;
    wherein the serving mobile switching center employs the established telephone number to connect the call to the roaming mobile device;
    wherein the serving mobile switching center connects the call to the roaming mobile device without allocation of a temporary roaming number for the roaming mobile device.

2. The apparatus of claim 1, wherein the established telephone number comprises a number associated with the roaming mobile device that a user of the communication device dials to initiate the call to the roaming mobile device.

3. The apparatus of claim 1, wherein the serving mobile switching center may employ the identification number for a plurality of contemporaneous calls.

4. The apparatus of claim 1, wherein upon receipt of a signaling message associated with the call that requests the identification number of the serving mobile switching center, the serving mobile switching center communicates the identification number to the originating mobile switching center.

5. The apparatus of claim 4, wherein the originating mobile switching center employs the identification number to determine that the serving mobile switching center is supporting the roaming mobile device for the call;
  wherein the originating mobile switching center employs the identification number to connect the call with the serving mobile switching center for delivery to the roaming mobile device associated with the established telephone number.

6. The apparatus of claim 1, wherein the serving mobile switching center is associated with a plurality of identification numbers, wherein the serving mobile switching center selects the identification number for the call from the plurality of identification numbers based on one or more characteristics of the call.

7. The apparatus of claim 6, wherein the identification number comprises a first identification number, wherein the call comprises a first call;
  wherein the serving mobile switching center selects the first identification number from the plurality of identification numbers to classify the first call into a first category;
  wherein upon receipt of a second call, the serving mobile switching center selects a second identification number from the plurality of identification numbers to classify the second call into a second category.

8. The apparatus of claim 7, wherein the serving mobile switching center provides a first service to the first call based on the first identification number;
  wherein the serving mobile switching center provides a second service to the second call based on the second identification number, wherein the second service differs from the first service.

9. The apparatus of claim 1, wherein one or more of the serving mobile switching center and the originating mobile switching center determine whether a path exists between the communication device and the roaming mobile device that supports signaling messages capable of carrying the identification number, the established telephone number, and a call identification value;
  wherein one or more of the serving mobile switching center and the originating mobile switching center employ the signaling messages capable of carrying the identification number, the established telephone number, and the call identification value to connect the call between the communication device and the roaming mobile device.

10. The apparatus of claim 1, wherein the serving mobile switching center indicates a requirement to the originating mobile switching center for the originating mobile switching center to employ a path between the communication device and the roaming mobile device that supports signaling messages capable of carrying the identification number, the established telephone number, and a call identification value.

11. The apparatus of claim 1, further comprising a home location register;
  wherein upon receipt of the call, the originating mobile switching center sends a first signaling message to the home location register to find a location of the roaming mobile device;
  wherein the home location register sends a second signaling message to the serving mobile switching center to request the identification number of the serving mobile switching center;
  wherein the serving mobile switching center sends the identification number to the home location register;
  wherein the home location register sends the identification number to the originating mobile switching center;
  wherein the originating mobile switching center sends a third signaling message to the serving mobile switching center that includes the identification number, the established telephone number, and a call identification value;
  wherein the serving mobile switching center employs the established telephone number to locate the roaming mobile device for connection the call to the roaming mobile device.

12. The apparatus of claim 1, wherein the serving mobile switching center provides the identification number to the originating mobile switching center in response to a request received after placement of the call by the communication device.

13. The apparatus of claim 1, wherein the serving mobile switching center sends the identification number to the originating mobile switching center through a home location register without storage of the identification number at the home location register.

14. The apparatus of claim 1, wherein the originating mobile switching center sends an initial address message to the serving mobile switching center to connect the call with the serving mobile switching center, wherein the initial address message comprises the identification number and a call identification value;
  wherein the serving mobile switching center sends a redirection request to the originating mobile switching center if the call is not completed to the roaming mobile device, wherein the redirection request comprises the call identification value;
  wherein the originating mobile switching center employs the call identification value to redirect the call to another destination.

15. A method, comprising the steps of:
  determining an identification number of a serving mobile switching center that supports a roaming mobile device; and
  connecting a call to the roaming mobile device without allocation of a temporary roaming number for the roaming mobile device through employment of the identification number to contact the serving mobile switching center and an established telephone number of the roaming mobile device to contact the roaming mobile device;
  employing the established telephone number of the roaming mobile device to locate the roaming mobile device for connection of the call to the roaming mobile device.

16. The method of claim 15, wherein the step of determining the identification number of the serving mobile switching center that supports the roaming mobile device comprises the step of:
  sending a signaling message to a home location register to initiate a request for the identification number from the serving mobile switching center.

17. The method of claim 16, wherein the signaling message comprises a first signaling message, wherein the step of connecting the call to the roaming mobile device without allocation of the temporary roaming number for the roaming mobile device through employment of the identification number to contact the serving mobile switching center and the established telephone number of the roaming mobile device to contact the roaming mobile device comprises the steps of:
  sending a second signaling message to the serving mobile switching center that includes the identification number, the established telephone number, and a call identification number.

18. The method of claim 15, wherein the step of connecting the call to the roaming mobile device without allocation of the temporary roaming number for the roaming mobile device through employment of the identification number to contact the serving mobile switching center and the established telephone number of the roaming mobile device to contact the roaming mobile device comprises the steps of:
   identifying a location of the roaming mobile device based on the identification number of the serving mobile switching center; and
   routing the call to the serving mobile switching center for delivery to the roaming mobile device.

19. The method of claim 18, wherein the established telephone number comprises a number associated with the roaming mobile device that a user of a communication device dials to initiate the call to the roaming mobile device, the method further comprising the step of:
   employing the established telephone number of the roaming mobile device, without allocation of the temporary roaming number for the roaming mobile device, to locate the roaming mobile device for connection of the call to the roaming mobile device.

20. The method of claim 15, wherein the serving mobile switching center comprises a plurality of identification numbers, wherein the identification number comprises a first identification number, wherein the call comprises a first call, wherein the step of determining the identification number of the serving mobile switching center that supports the roaming mobile device comprises the steps of:
   selecting the first identification number from the plurality of identification numbers based on one or more characteristics of the first call; and
   providing a first service to the first call based on the first identification number;
   the method further comprising the steps of:
   selecting, upon receipt of a second call, a second identification number from the plurality of identification numbers based on one or more characteristics of the second call; and
   providing a second service that differs from the first service to the second call based on the second identification number.

21. The method of claim 15, wherein a communication device placed the call to the roaming mobile device, wherein the step of connecting the call to the roaming mobile device without allocation of the temporary roaming number for the roaming mobile device through employment of the identification number to contact the serving mobile switching center and the established telephone number of the roaming mobile device to contact the roaming mobile device comprises the steps of:
   determining whether a path exists between the communication device and the roaming mobile device that supports signaling messages capable of carrying the identification number, the established telephone number, and a call identification value; and
   employing the signaling messages capable of carrying the identification number, the established telephone number, and the call identification value to connect the call between the communication device and the roaming mobile device.

22. The method of claim 15, further comprising the step of:
   sending the identification number from the serving mobile switching center through a home location register to an originating mobile switching center in response to a request received after placement of the call by a communication device, wherein the home location register does not store the identification number.

23. The method of claim 15, further comprising the steps of:
   sending an initial address message from an originating mobile switching center to the serving mobile switching center to connect the call with the serving mobile switching center, wherein the initial address message comprises the identification number and a call identification value;
   sending a redirection request from the serving mobile switching center to the originating mobile switching center if the call is not completed to the roaming mobile device, wherein the redirection request comprises the call identification value; and
   employing the call identification value to redirect the call from the originating mobile switching center to another destination.

24. An article, comprising:
   one or more computer-readable signal-bearing media;
   means in the one or more media for determining an identification number of a serving mobile switching center that supports a roaming mobile device; and
   means in the one or more media for connecting a call to the roaming mobile device without allocation of a temporary roaming number for the roaming mobile device through employment of the identification number to contact the serving mobile switching center and an established telephone number of the roaming mobile device to contact the roaming mobile device;
   means in the one or more media for employing the established telephone number of the roaming mobile device to locate the roaming mobile device for connection of the call to the roaming mobile device.

* * * * *